United States Patent Office 3,790,458
Patented Feb. 5, 1974

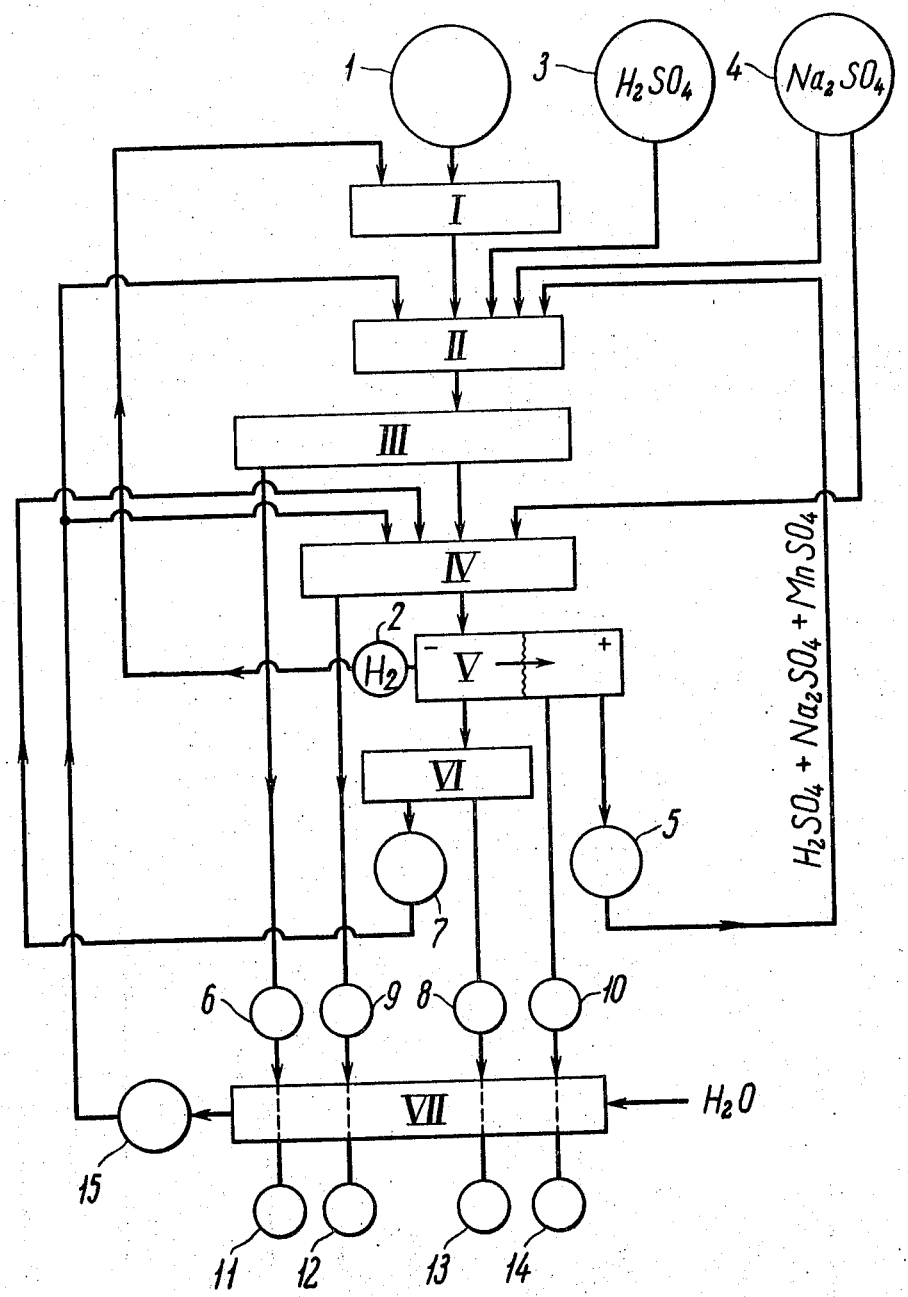

3,790,458
METHOD OF ELECTROCHEMICAL PROCESSING OF MANGANESE ORES AND THEIR CONCENTRATION WASTES
Nazi Vladimirovna Demuria, ulitsa Grishashvili 42, and Rafael Ilich Agladze, prospekt Plekhanova 96/90, kv. 1, both of Tbilisi, U.S.S.R.
Filed Oct. 18, 1972, Ser. No. 298,629
Int. Cl. B01k 1/00
U.S. Cl. 204—96    6 Claims

ABSTRACT OF THE DISCLOSURE

A method of electrochemical processing of manganese ores and their concentration wastes comprising the leaching of said manganese-containing starting material with an aqueous acid solution with the formation of a manganese salt. Said solution of a manganese salt is separated from waste rock and subjected to electrolysis in a membrane-type electrolyzer. The electrolysis is performed in the presence in the solution, in addition to a manganese salt, of a salt of an alkali or alkaline-earth metal at a temperature of 80–100° C. in the anode space and at a ratio between the cathodic and anodic current densities of at least 1.2. Upon the electrolysis there are formed: hydrogen—at the cathode and manganous hydroxide and alkaline catholyte in the cathode space, as well as manganese dioxide at the anode and anolyte comprising an acid and a salt of an alkali or alkali-earth metal in the anode space. Waste electrolyte—anolyte—is fed into the stage of leaching the manganese-containing starting material.

The method according to the invention allows to perform the electrolysis in such a way that both anodic and cathodic processes are utilized for precipitation of manganese from the solution in the form of concentrates with minimum power consumption.

---

The present invention relates to a method of electrochemical processing of manganese ores and their concentration wastes to produce manganese concentrates—manganous hydroxide and manganese dioxide.

It is known to process manganese ores and their concentration wastes to produce manganese concentrates, especially manganous hydroxide. In accordance with this method manganese ore is leached with an aqueous solution of sulphuric acid with subsequent precipitation of manganous hydroxide from the solution with quick lime or caustic soda.

In the case, where caustic soda is used to precipitate manganous hydroxide, recovery of sulphuric acid and caustic soda is performed. In this case a solution of sodium sulphate resulting from precipitation of manganous hydroxide is subjected to electrolysis. Then anolyte containing sulphuric acid is used for ore leaching, while subsequent precipitation of manganous hydroxide is effected with catholyte containing caustic soda.

The disadvantage of the above-described method consists in that in the case, where quick lime is used, a considerable non-recoverable consumption of sulphuric acid and quick lime takes place with their conversion into useless gypsum contaminated with waste rock, while in the case of utilization of caustic soda the process has a plurality of stages and exhibits high power consumption.

It is also known to electrochemically process manganese ores and their concentration wastes to produce manganese dioxide. In accordance with this method manganese ore or its concentration waste is leached with an aqueous solution of sulphuric acid with the formation of an aqueous solution of manganese salt. Said solution of manganese salt (electrolyte) is separated from waste rock, and manganese dioxide is precipitated therefrom at the anode by subjecting to electrolysis. Waste electrolyte—anolyte— containing acid is fed for leaching the starting material.

The disadvantage of this method consists in high power consumption, non-utilization of the cathode process for manganese precipitation and, as a result, low rate of extraction of manganese from the solution fed for electrolysis.

It is an object of the present invention to provide a method of electrochemical processing of manganese ores and their concentration wastes which ensures maximum yield of manganese in the form of concentrate from a solution during the electrolysis with minimum power consumption.

In accordance with this and other objects the invention consists in that manganese ore or its concentration waste is leached with an aqueous solution of an acid with the formation of an aqueous solution of a manganese salt (electrolyte). Said solution of a manganese salt is separated from waste rock ($SiO_2$, $CaSO_4$ and other acid-insoluble compounds) and is subjected to electrolysis. Waste electrolyte—anolyte—containing an acid is fed for leaching the starting manganese-containing material. In accordance with the invention the electrolysis is performed in a membrane-type electrolyzer in the presence in a solution of an alkali or alkaline-earth metal salt in addition to a manganese salt at a temperature of 80–100° C. within the anode space and at a ratio between the cathodic and anodic current densities of at least 1.2. The electrolysis results in the formation of hydrogen at the cathode and manganous hydroxide and alkaline catholyte in the cathode space, as well as manganese dioxide at the anode and anolyte containing in addition to an acid an alkali or alkaline-earth metal salt in the anode space. The resulting manganous hydroxide is discharged from the electrolyzer in the form of paste with the admixture of a part of alkaline catholyte.

The performance of the electrolysis at 80–100° C. in the anode space ensures the deposition of dense precipitate of manganese dioxide at the anode. The anodic current density is maintained at lower level as compared to the cathodic current density. Higher current density in the cathode space and the presence of salts of alkali or alkaline-earth metals (such as $Na_2SO_4$, $MgSO_4$) in electrolyte ensures an increase in pH (alkalization) of catholyte and formation of manganous hydroxide in the cathode space. The cause of the alkalization is the discharge of hydrogen ions $H^+$ at the cathode and associated increase in concentration of $OH^-$ ions in the cathode space. The discharge of manganese ions at the cathode with the formation of metallic manganese at a temperature 80–100° C. does not occur, since at these temperatures only hydrogen release takes place, hydrogen exhibiting substantially lower over tension at these temperatures.

The electrolysis may be performed either in an electrolyzer having one embrane between the electrodes, or in an electrolyzer having two membranes (the latter is more preferable). Where the electrolysis is performed in the electrolyzer having one membrane, an aqueous solution of a manganese salt is fed into the cathode space, while in case of the electrolyzer having two membranes said solution of a manganese salt is fed into the intermembrane space.

In order to produce highly manganous hydroxide and manganese dioxide, it is preferable to subject an aqueous solution of a manganese salt to additional purification prior to the electrolysis. To accomplish this, alkaline catholyte is separated from manganous hydroxide discharged from the electrolyzer in the form of paste, and said catholyte is added into an aqueous solution of a manganese salt. The resulting precipitate of ferric and aluminium hydroxides in the form of sludge is separated from said solution.

If the starting material contains a substantial quantity of acid-insoluble manganese oxide ($MnO_2$) it is advantageous to reduce manganese ore or its concentration waste prior to the leaching at 350–900° C. with hydrogen resulting from the electrolysis.

In order to separate manganous hydroxide, manganese dioxide and waste rock from alkali and alkaline earth metal salts, undecomposed manganese salts and acid, said products are washed with water. Washed waste rock and sludge may be used in the manufacture of binders (construction materials, cement production). Washing water after washing the above-said products is returned back into the processing prior to the electrolysis stage in order to compensate for losses of water in the system due to decomposition and evaporation at the electrolysis stage.

In order to remove water and to obtain a product having elevated manganese content, manganous hydroxide is subjected to heat treatment at 100–600° C. after washing with water.

The method according to the invention is carried out as herebelow described with reference to the accompanying drawing (for purposes of illustration only a specific lenching agent—sulphuric acid—is used, while a salt added into electrolyte comprises sodium sulphate).

Referring to the drawing, manganese ore or its concentration waste 1, in the case where it contains substantial quantity of manganese dioxide (rather than manganese carbonate), is subjected to preliminary reduction 1 at 350–900° C. with hydrogen 2 resulting from the electrolysis (see below). Then the reduced ore or its concentration waste is leached (II) with an aqueous solution of sulphuric acid 3. If manganese-containing starting material comprises mainly manganese carbonate, such material may be fed directly for leaching. An aqueous solution of sulphuric acid is used only at the beginning in order to prepare an aqueous solution of a manganese salt (electrolyte). In order to prepare electrolyte having a desired composition, sodium sulphate 4 is fed into the leaching stage also at the beginning of the process only. Subsequently the leaching is effected with waste electrolyte—anolyte—5 containing sodium sulphate, a part of undecomposed manganese sulphate and sulphuric acid which is formed upon decomposition of a manganese salt in the electrolyzer.

In the case of leaching with sulphuric acid the process of leaching and electrolysis in the membrane-type electrolyzer has the following chemical mechanism:

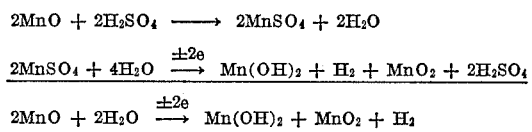

During the electrolysis hydrogen is released at the cathode, manganous hydroxide—in the cathode space, while manganese dioxide is deposited in the form of a dense layer at the anode. The presence of an alkali metal in the electrolyte, which is introduced in the form of sodium sulphate, provides for alkalization of catholyte during the electrolysis, thereby resulting in precipitation of manganous hydroxide $Mn(OH)_2$.

An aqueous solution of manganese sulphate resulting from leaching of the manganese-containing starting material and containing also sodium sulphate is separated by filtering (III) from waste rock 6. In the case, where it is necessary to obtain highly pure manganous hydroxide and manganese dioxide, said solution (electrolyte) is subjected to additional purification (IV) which will be described below.

Further the electrolyte is fed for electrolysis (V) into a membrane-type electrolyzer. Accordingly, the electrolyte is fed into the cathode space of the electrolyzer and after leaking through the membrane is discharged from the anode space to be fed into the leaching stage (II). As it was mentioned above, the waste electrolyte—anolyte—contains, together with sulphuric acid and sodium sulphate, a part of undecomposed manganese salt. It is not expedient to conduct the electrolysis with complete precipitation of manganese in the eelctrolyzer, since a yield of manganese with respect to the current value is reduced with the decrease of manganese content in the electrolyte. The presence of an alkali metal salt in the electrolyte improves conductance of the electrolyte; thereby allowing the reduction of specific power consumption.

As it was mentioned above, in order to obtain highly pure manganous hydroxide and manganese dioxide, the electrolyte is subjected to additional purification (IV) prior to the electrolysis. The additional purification consists in precipitating iron and aluminium impurities, which are present in the manganese salt solution, in the form of ferric hydroxide $Fe(OH)_3$ and aluminium hydroxide $Al(OH)_3$. If after the leaching iron is in the bivalent form, it is preliminary oxidized with manganese dioxide (prior to the leaching). In order to precipitate iron and aluminium, alkaline catholyte 7 is used. The catholyte is preliminary separated by filtering (VI) from manganese hydroxide 8 discharged from the electrolyzer in the form of fluid paste. Precipitate of ferric and aluminium hydroxides after separation thereof from the manganese salt solution (electrolyte) comprises production waste (sludge) 9. In addition to the precipitation of impurities from the electrolyte, an adjustment of composition of the electrolyte may be effected at the additional purification stage (IV), for instance by introducing sodium sulphate 4 into the electrolyte.

Waste rock 6, sludge 9, manganous hydroxide 8 and manganese dioxide 10 are fed for washing (VII) with water. As a result, waste rock 11, sludge 12, manganous hydroxide 13 and manganese dioxide 14 washed from sodium sulphate, undecomposed manganese sulphate and sulphuric acid are obtained. Washing water 15 is returned back into the processing before the electrolysis stage (V), the washing water resulting from washing manganous hydroxide and manganese dioxide being fed into the stage of additional purification (IV) of the electrolyte, while the washing water resulting from washing of waste rock and sludge being fed into the leaching stage (II). The recovery of washing water back into the processing makes it possible to compensate for losses of water due to decomposition and evaporation thereof at the electrolysis stage.

Manganous hydroxide obtained in the form of paste may be subjected to heat treatment at 100–600° C. as it was mentioned above, after separation from alkaline catholyte and washing with water, in order to remove water and to obtain dry product having elevated manganese content.

The above-described closed technological process of producing highly concentrated products containing more than 60% of Mn from manganese ores and their concentration wastes allow simultaneous precipitation of manganese both at the anode and cathode thereby ensuring lower specific power consumption for manufacturing the desired product.

The invention will be better understood from the following examples illustrating the electrolysis stage.

EXAMPLE 1

Composition of electrolyte

|  | G./l. |
|---|---|
| $Na_2SO_4 \cdot 10H_2O$ | 300 |
| $MnSO_4$ | 100 |

Conditions of the electrolysis

| | |
|---|---|
| Temperature in the anode space | 85–92° C. |
| Anodic current density | 1 a./dm.$^2$ |
| Cathodic current density | 8 a./dm.$^2$. |
| Test duration | 10 hours. |
| Cathode material | Nickel network. |
| Anode material | Lead containing 1% of Ag. |

A total power consumption per the products simultaneously obtained in the electrolyzer—1 t. of Mn(OH)$_2$ and 1.03 t. of MnO$_2$— was of 2873 kwh. A content of sulphuric acid in waste electrolyte (anolyte) was of 120 g./l.

EXAMPLE 2

Test conditions were similar to those described in Example 1. The difference consisted in that the cathode was made of titanium, while the anode—of titanium coated with manganese dioxide. Duration of the test was of 250 hours.

A total power consumption under the above conditions per 1.1 t. of Mn(OH)$_2$ and 1 t. of MnO$_2$ was of 3000 kwh.

A content of sulphuric acid in watse electrolyte (anolyte) was of about 25 g./l.

EXAMPLE 3

Composition of electrolyte

| | G./l. |
|---|---|
| NaNO$_3$ | 100 |
| Mn(NO$_3$)$_2$ | 100 |

Conditions of electrolysis

| | |
|---|---|
| Temperature in the anode space | 92–100 C. |
| Anodic current density | 1.2 a./dm.$^2$ |
| Cathodic current density | 2.5 a./dm.$^2$. |
| Test duration | 200 hours. |
| Cathode material | Titanium. |
| Anode material | Titanium coated with manganese dioxide. |

A total power consumption under the above conditions per 1 t. Mn(OH)$_2$ and 1 t. of MnO$_2$ was of 2500–2800 kwh.

What we claim is:

1. A method of electrochemical processing of manganese ores and their concentration wastes to produce manganese concentrates comprising the steps of leaching said manganese ores and their concentration wastes with an aqueous acid solution resulting in the formation of an aqueous solution of a manganese salt; separating of said solution of a manganese salt from waste rock and subjecting the former to electrolysis in a membrane-type electrolyzer; the electrolysis being performed in electrolyte comprising addition to said solution of a manganese salt, a salt of a metal selected from the group consisting of alkali and alkaline-earth metals at a temperature of 80–100° C. in the anode space and at a ratio between the cathodic and anodic current densities of at least 1.2; the electrolysis resulting in the formation of hydrogen at the cathode and manganous hydroxide and alkaline catholyte in the cathode space, as well as manganese dioxide at the anode and anolyte comprising an acid and a salt of a metal selected from the group consisting of alkali and alkaline-earth metals in the anode space; waste electrolyte—anolyte—being fed into the stage of leaching of the starting manganese-containing material; and discharging manganous hydroxide resulting from the electrolysis from the electrolyzer in the form of paste with the admixture of a part of the alkaline catholyte.

2. A method according to claim 1, wherein the electrolysis is performed in an electrolyzer comprising two membranes disposed between the electrodes, the aqueous solution of a manganese salt being introduced into the inter-membrane space.

3. A method according to claim 1, wherein alkaline catholyte is separated from manganous hydroxide discharged from the electrolyzer, and said catholyte is added to the aqueous solution of a manganese salt prior to the electrolysis in order to effect additional purification of said solution, the resulting precipitate of ferric and aluminium hydroxides—sludge—being separated from said solution.

4. A method according to claim 1, wherein manganese ore or its concentration waste is reduced at 350–900° C., prior to the leaching, with hydrogen obtained during the electrolysis.

5. A method according to claim 1, wherein the resulting manganous hydroxide, manganese dioxide, waste rock and sludge are washed with water, the washing water resulting from washing of said products being returned back into the processing prior to the electrolysis stage.

6. A method according to claim 5, wherein manganous hydroxide is subjected to heat treatment at 100–600° C. after the washing.

References Cited

UNITED STATES PATENTS 2,417,259   3/1947   Mitchell et al. _____ 204—96

JOHN H. MACK, Primary Examiner

W. I. SOLOMON, Assistant Examiner

U.S. Cl. X.R.

204—234